US005230942A

United States Patent [19]

Courtoy et al.

[11] Patent Number: 5,230,942

[45] Date of Patent: Jul. 27, 1993

[54] BIREFRINGENT INLAID SHEET

[75] Inventors: Jean-Francois Courtoy, St-Bruno; Constantin Nedea, St-Laurent, both of Canada

[73] Assignee: Domco Industries Ltd., Quebec, Canada

[21] Appl. No.: 684,240

[22] Filed: Apr. 12, 1991

[51] Int. Cl.[5] .......... B32B 3/00

[52] U.S. Cl. .......... 428/143; 428/46; 428/195; 428/204; 428/206; 428/327; 428/402

[58] Field of Search .......... 428/64, 147, 207, 215, 428/49, 143, 46, 323, 204, 206, 195, 207, 410, 327, 402; 252/582; 524/290, 294, 296, 114; 525/124; 446/389; 493/288; 427/278

[56] References Cited

U.S. PATENT DOCUMENTS

| | | | |
|---|---|---|---|
| 2,663,171 | 12/1953 | Boone | 63/32 |
| 3,998,524 | 12/1976 | Hubby, Jr. et al. | 350/157 |
| 4,440,826 | 4/1984 | Witman | 428/327 |
| 5,015,516 | 5/1991 | Lussi et al. | 428/143 |

FOREIGN PATENT DOCUMENTS

| | | |
|---|---|---|
| 8302418 | 2/1985 | Netherlands . |
| 87-02310 | 4/1987 | PCT Int'l Appl. . |

*Primary Examiner*—Patrick J. Ryan
*Assistant Examiner*—W. Krynski
*Attorney, Agent, or Firm*—Fitzpatrick, Cella, Harper & Scinto

[57] ABSTRACT

A decorative inlaid sheet material comprising a sheet of flexible substrate and a plastic layer comprising birefringent particles (or flitters) dispersed in plastisol or organosol. Preferably, the plastisol or organosol is clear or translucent.

7 Claims, 2 Drawing Sheets

BIREFRINGENT INLAID SHEET

FIELD OF THE INVENTION

The present invention is concerned with a decorative inlaid sheet material containing birefringent particles (flitters) dispersed in a plastisol or organosol.

BACKGROUND OF THE INVENTION

Sheets of resinous composition have found widespread use as a decorative and wear resistant coverings for a wide range of products. Such sheets are used, for example, as wall, floor and table coverings. When these sheet materials are made with chips or other particulate material, they are commonly referred to as inlaids. Inlaid floor coverings are normally characterized as those which maintain their decorative appearance as the surface is worn or abraded away. The patterns and designs and other decorative effects of these inlaid coverings are of prime importance in insuring commercial acceptability in the public market.

Modern inlaids generally fall into two classifications: resilient and non-resilient. Resilient inlaids include a substantially continuous layer of foam and are usually made by incorporating solid particulate material into a plastisol coating, followed by gelling and fusing. Non-resilient inlaids do not contain a foam layer and are usually made by sintering and/or calendering, or otherwise particulate material compacting.

Many processes are known for embedding various particles into a clear plastisol in order to make decorative inlaid patterns. Examples of these processes are found in U.S. Pat. No. 4,440,826 (Armstrong World Industries), U.S. Pat. No. 4,212,691 (Congoleum Corp.), U.S. Pat. No. 4,794,020 (Tarkett Inc.), U.S. Pat. No. 4,675,216 (Sommer S. A.) and U.S. copending application Ser. No. 553,319, filed Jul. 17, 1990, now U.S. Pat. No. 5,071,680. Metallic or pearled flakes have also been used to replace grounded PVC sheets. Some people have also combined all these different techniques to create original decorations.

Some of these processes involve the deposition of particles of colored polyvinylchloride (PVC) having a high carbonate or vinyl concentration. Others are arranged to create geometric structures. The deposits constitute the surface layer of all the sheet materials produced by these processes and the desired sheet is completed by applying clear plastisol, either translucent or opaque, which serves as a binding agent between the particles. (see U.S. Pat. No. 4,916,007 Tarkett Inc.)

The additional decorative benefit of birefringent particles added to inlaid sheet materials as described above is also an object of the present application.

SUMMARY OF THE INVENTION

In accordance with the present invention, there is now provided a decorative inlaid sheet material which comprises:

a substrate; and a layer of plastisol or organosol overlying and in contact with said substrate, said plastisol or organosol containing a dispersion of birefringent particles (flitters), the birefringence of said particles being maintained in said layer of plastisol or organosol.

Preferably, the plastisol or organosol is clear or translucent.

In one aspect of the present invention, the flitters can be mixed with the plastisol or organosol, and subsequently applied on the surface of the sheet of flexible substrate.

In a further aspect of the invention, the flitters can be deposited on the surface of the sheet of flexible substrate, with subsequent application of plastisol or organosol thereon, followed by gellation and fusion.

The inlaid decorative sheet material of the present invention may also contain a printed layer comprising a pattern and an ink suitable for floor or wall covering applications, and located between the substrate and the layer of plastisol or organosol.

The flitters are dispersed in the plastisol or organosol in an amount varying from about 0.25 to about 30% by weight, with a preferred range of about 0.5 to about 2.5% by weight.

To improve its resistance and longevity, the decorative inlaid sheet material of the present invention may also contain a wear layer.

IN THE DRAWINGS

FIG. 1 is a schematic perspective and cross-sectional view of the decorative inlaid sheet material of the present invention; and FIG. 2 is a diagram representing the various steps in the process of making the sheet material of the present invention.

DETAILED DESCRIPTION OF THE INVENTION

Figure 1:
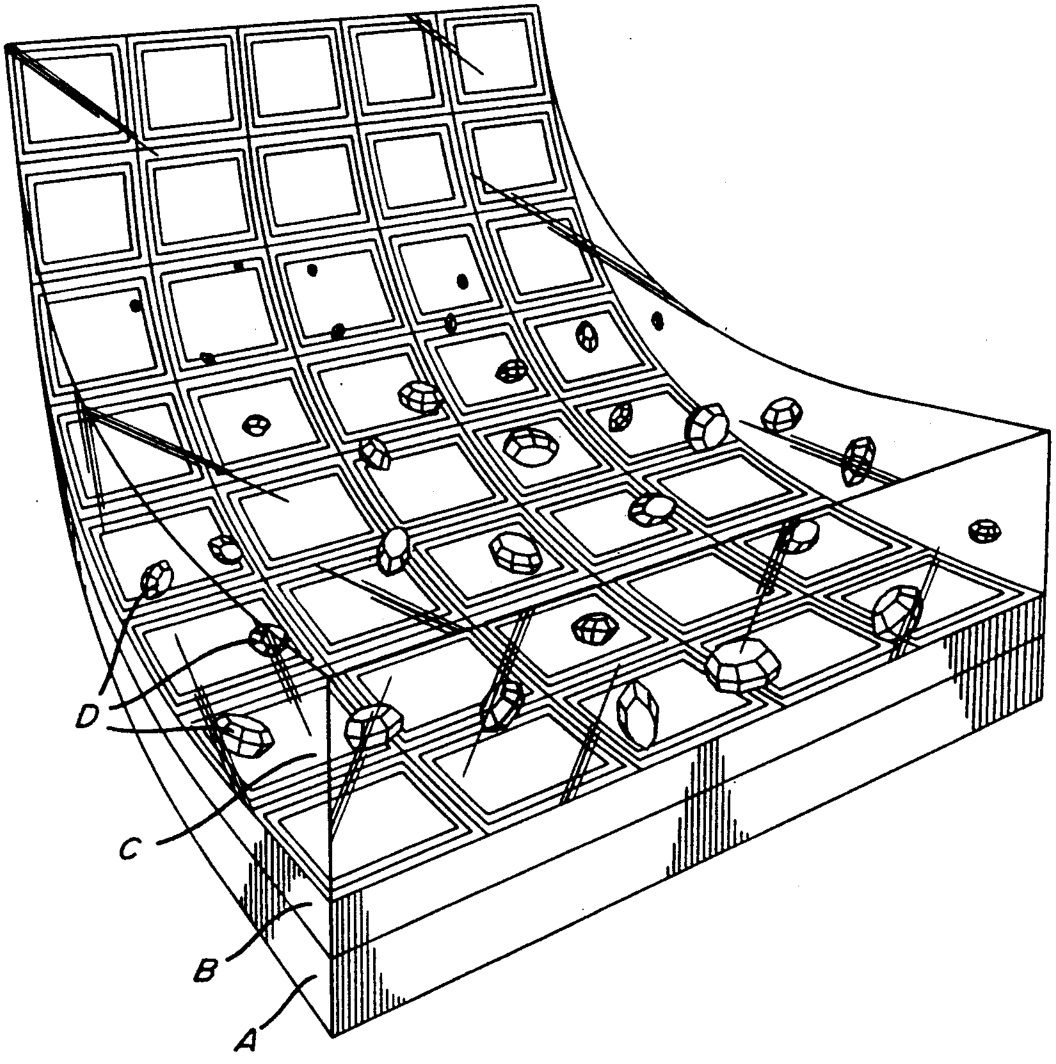

In FIG. 1:

A represents the substrate layer;

B represents the printed layer;

C represents the plastisol or organosol layer containing the birefringent particles D.

The term plastisol used throughout the present application is defined as a finely divided resin, such as PVC resin, dispersed in one or more plasticizers. The mixture may also contain other chemicals such as stabilizers, additives, solvents and the like. Heating plastisol results in gelling of the paste by solvation of the resin particles by the plasticizer(s). Examples of well known plasticizers suitable for such purposes are: diooctyl phtalate (DOP); diooctyl adipate (DOA); diisodecyl phtalate (DIDP); S-160 TM, S-213 TM, S-148 TM, S-143 TM and Santicizer TM 269 all manufactured and sold by Monsanto; TXIB TM and Koslaflex TM DOP manufactured and sold by Eastman; N-1046 TM manufactured and sold by Hüls; Paraplex TM G-62 manufactured and sold by Rohm & Haas; Benzoflex ® 9-88 and Benzoflex ® 284 manufactured and sold by VELSICOL CHEMICAL CORP.; and Palatinol ® 79 and Palatinol ® 711P, manufactured and sold by BASF. Examples of suitable stabilizers are: Irgastab TM BZ-512, Irgastab TM T-634 and Tinuvin TM 571 all manufactured and sold by Ciba-Geigy; and Synpron TM 1363 manufactured and sold by Synthetic Product. Examples of suitable additives or solvents are: BYK TM 4010 and BYK TM 4015 manufactured and sold by BYK Chemie; Reofos TM 50 manufactured and sold by Ciba-Geigy; SR 350 TM, SR 454 TM and SR 399 TM manufactured and sold by Sartomer; and Cereclor TM S52 manufactured and sold by I.C.I. For the purpose of the present invention, the term plastisol is intended to include also organosol; however, organosol is a plastisol that contains a volatile solvent that is driven off upon heating.

Literally the birefringence is the double bending of light by crystalline products. These products are also qualified as anisotropic, the anisotropy being descriptive of materials with an index of refraction varying with the direction of the incident light. Accordingly, birefringent products have a different color depending on the angle on which one looks at it. The term "color" refers to the iridescence caused by the birefringence phenomenon. Though birefringence generally characterizes crystalline minerals, thin films of several polymer mixtures have been found to be birefringent.

As an example of birefringent particles, there may be mentioned the PS HR 422 TM manufactured and sold by MAZZACCA CORP., Wayne, N.J. in the form of chips, which consists in a mixture of acrylates copolymer, ethylene vinylacetate (EVA) copolymer and polybutylene terephthalate. When this product is mixed with usual constituents of plastisol or organosol, i.e., plasticizers, viscosity reducing agents, stabilizers, solvents and the like, and heated at the fusion temperature of said plastisol or organosol, the swelling of the flitters in the mixture causes the disappearance of the color of said flitters. Accordingly, the flitters are no longer birefringent and the phenomenon is not reversible because of the presence of plasticizers in the layer, which do not evaporate. The same results would therefore be anticipated if the flitters were mixed with normal plastisol or organosol, which contains resin particles.

However, it has unexpectedly been found that the birefringence of the particles remains intact when they are mixed with normal plastisol or organosol, even after gellation and fusion. In other words, the heating of a mixture of flitters dispersed in the plastisol, does not alter the birefringence of the particles.

It is believed that the PVC particles and the flitters "compete" for the absorption of the liquid constituents of the plastisol or organosol, and that ultimately, there is little absorption or no absorption at all of these liquid constituents by the flitters, thus preventing them from swelling. It is the swelling of the flitters that makes them lose their birefringence. This belief is supported by the fact that when the clear or translucent PVC plastisol is maintained at the fusion temperature (about 170° C.) for a period of time longer than what is usually required, the color of the flitters tends to change slightly, but well after the PVC particles have darkened and decomposed. It is well known in this art that in plasticized PVC, the plasticizer is not immobilized by the PVC, but rather that a balanced mobilization of the plasticizer is observed. This is illustrated by migration phenomenons of plasticizers, which are very common and well known in this art.

The fusion and subsequent decomposition of the PVC particles in the plastisol usually takes about 2 minutes, while the swelling of the flitters causing the disappearance of their color, more than 5 minutes, depending on the fusion temperature. These data clearly indicate that the flitters are much more stable in the plastisol than the PVC resin particles.

An other explanation for the results obtained is that upon gellation, the plastisol becomes solid, and thus compresses the filters so much that swelling becomes impossible since swelling involves an increase in the size of the flitters, and the free volume available around the flitters is significantly reduced.

Swelling, however, can sometimes be a reversible phenomenon. For example, when the flitters are mixed with methylethylketone, a volatile solvent, they swell and, as expected, the color disappears. Air drying allows them to regain their birefringence properties, and thus, their color.

The various processes which can be used for the preparation of the decorative inlaid sheet material of the present invention are well known to those skilled in the art of manufacturing floor or wall covering products. These processes include for example those found, or referred to, in U.S. Pat. No. 4,440,826 (Armstrong World Industries), U.S. Pat. No. 4,212,691 (Congoleum Corp.), U.S. Pat. No. 4,794,020 (Tarkett Inc.), U.S. Pat. No. 4,675,215 (Sommer S. A.) and U.S. copending application Ser. No. 553,319, filed Jul. 17, 1990, the latter being preferred for the processing of the plastisol or organosol layer containing the flitters.

Figure 2:
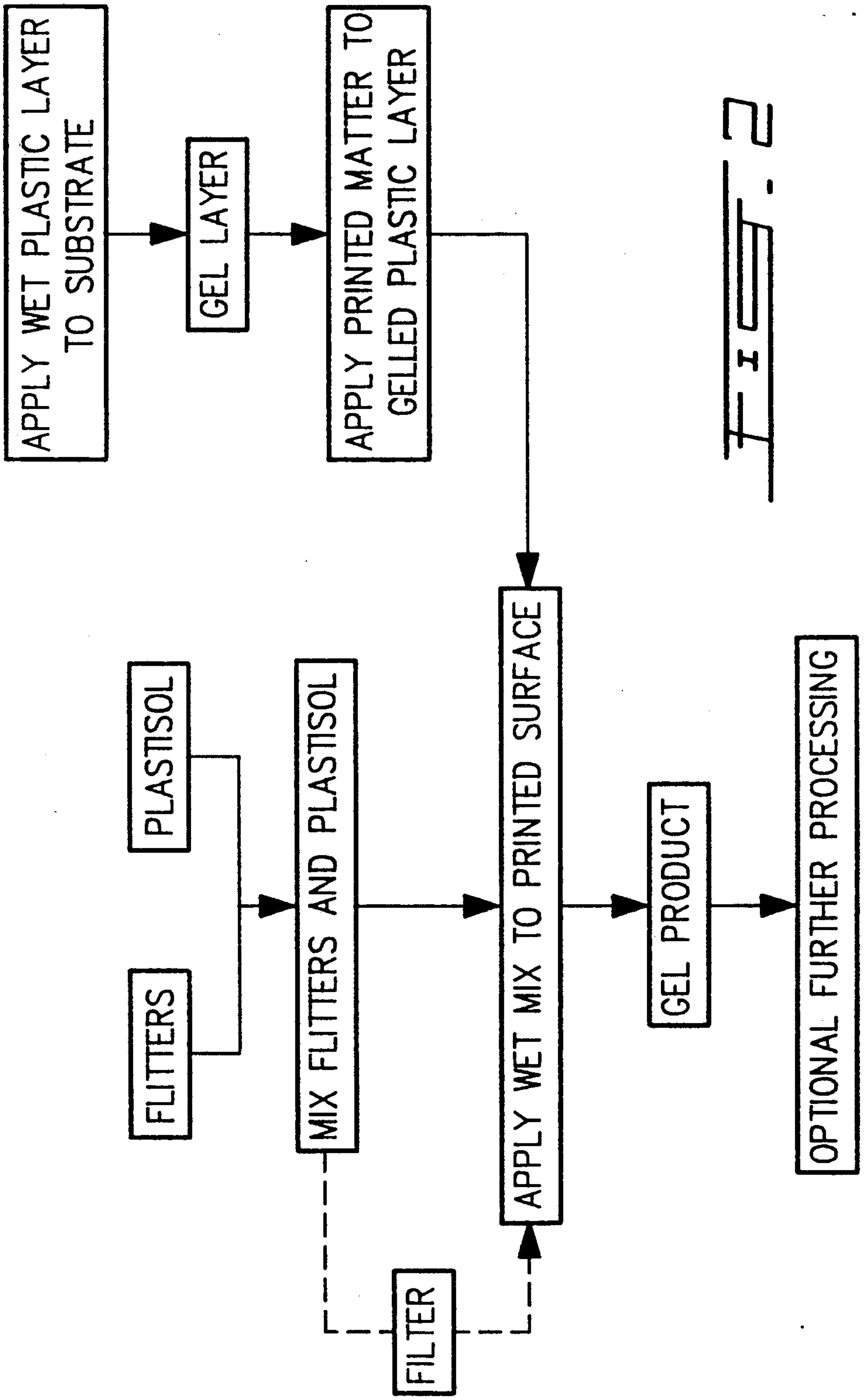

FIG. 2 illustrates the preferred preparation process for the decorative inlaid sheet material of the present invention.

Briefly, a wet plastic layer is applied on the substrate, followed by a gellation step, and if desired, by a printing step. These steps are of common knowledge in the art, and detailed descriptions may be found in U.S. Pat. Nos. 4,017,658 and 3,293,108.

The flitters are blended with plastisol or organosol. This mixture can be optionally filtered to a mesh size greater than that of the PVC particles and the flitters to avoid agglomeration and contamination. The resulting wet mixture is then applied on the printed layer or non printed layer obtained in the previous paragraph. Gellation and fusion subsequently provide the desired inlaid sheet material, which contains birefringent particles.

As for the various materials which can be used for the preparation of the substrate or substrate layer, these materials are also well known by a person skilled in the art. Typically, the substrate or substrate layer is made of jute fibers, asbestos, non-woven glass fibers, synthetic foam and the like. Examples of these materials can be found in U.S. Pat. No. 4,794,020.

The general thickness of the flitters commercially available is about 0.0009 to 0.0013 inch. Preferably, the thickness of the plastisol or organosol layer containing the flitters is at least three times the thickness of the flitters, and can be up to 0.100 inch. It should be noted that the thickness of the plastisol or organosol layer can be adapted, depending on the desired performance of the inlaid sheet material and on the preparation process used.

The following examples are intended to demonstrate preferred embodiments of this invention without limitating the scope thereof. In the following examples, all parts percentages are by weight by 100 PVC part.

EXAMPLE 1

The following test was carried on all the plastisol liquid constituents, i.e. plasticizers, stabilizers, additives and solvents referred to in p. 4 line 16 to p. 5 line 3 to verify that, when the flitters are dispersed in these constituents, they systematically swell, and therefore loose their color.

A sample of a plastisol liquid constituent to be tested is placed in a test tube. In order to monitor the elevation of temperature of the sample, the test is carried out simultaneously with a tube containing dioctyl phtalate and a thermocouple dipped therein. Both tubes are placed in an oven at 205° C., and the increase of temperature is closely monitored. When the temperature indicated by the thermocouple reaches 170° C., both tubes are taken out of the oven, and about 0.2 g of flitters are added to the plastisol liquid constituent tube. The tubes are then sent back in the oven, until the temperature indicated by the thermocouple reaches 175° C. The tubes are then pulled out and cooled at room temperature. The results obtained for each plastisol liquid constituent tested showed that the color of the flitters has disappeared.

Any other plastisol liquid constituent complying with the above test is suitable for the purposes of the present invention.

EXAMPLE 2

A floor covering substrate sheet of standard type non-asbestos felt approximately 30 mils thick is coated with 10 mils of a foamable plastisol the composition of which is as follows:

| | PARTS BY WEIGHT |
|---|---|
| PVC dispersion resin K value: 67 (Oxy TM 625) | 70 |
| PVC extender resin relative visc. 2.25 (Oxy TM 567) | 30 |
| Butyl Benzyl Phthalate | 35 |
| Di-(2-ethylhexyl) Phthalate | 8 |
| Texanol Isobutyrate (TXIB) | 12 |
| Titanium Dioxide | 5.5 |
| Snowhite TM #9 (calcium carbonate) | 11.0 |
| Antimony Trioxide | 5.5 |
| Azodicarbonamide | 3.4 |
| Zinc oxide | 1.0 |
| Mineral spirit | 3.0 |
| Brookfield HBT TM - viscosity 2800 CPS - spindle 4-20 rpm - 25° C. | |

The coated substrate is then gelled in a hot air circulating oven at 140° C. for 2 minutes. The surface is then printed on a multihead gravure press using vinyl inks prepared by Domco Industries Limited. The ink used to print the valley area of the (registered and non-registered embossing) pattern contains additionally 15 parts of trimellitic anhydride (TMA) to suppress in specific areas the decomposition of the foamable plastisol according to Congoleum patent U.S. Pat. No. 3,293,094.

After printing, the flitter-plastisol mixture is applied 15 mils thick using a reverse roll coater. A total of 560 g/m$^2$ of flitter-plastisol mixture is coated of which 4 p.h.r. are flitters.

EXAMPLE 3

The composition of the clear plastisol is:

| | PARTS BY WEIGHT |
|---|---|
| PVC dispersion resin: relative viscosity: 2.30 (Oxy TM 68 HC) | 97 |
| PVC extender resin: relative viscosity: 2.25 (Oxy TM 567) | 3 |
| Phosphate esther Reofos TM 50 (Ciba Geigy) | 5.5 |
| Monoisobutyrate Monobenzoate Ester (Nuoplaz TM 1046 - Hüls Chemicals) | 32 |
| Texanol Isobutyrate TXIB | 10 |
| Butyl Benzyl Phthalate | 13 |
| Stabilizer, Barium - zinc type (Synpron TM 1363) | 3 |
| Flitters (PS HR 422 TM) | 4 |

The floor covering product thereby produced displays a relief structure (embossing) in register with the printed areas. To protect the surface even further another protective coating of 1 mil dry of water base polyurethane is supplied and has the following composition:

| | PARTS BY WEIGHT |
|---|---|
| Water base polyurethane coating - Permuthane TM coating 35% solid | 100 |
| Antifoaming agent (BYK TM chemical) | .125 |
| Viscosity Zahn: cup #2 - 21 seconds | |

The wet 3 mils of polyurethane coating is applied on the embossed product using an air knife.

It is then dried and cured in a hot air circulating oven for 2 minutes. The temperature profile is 121/204/204° C. in successive zones.

The floor covering product thereby produced exhibits its excellent wear and design characteristics. The birefringence of the flitters remains intact even when the surface of the sheet material has started to abrade after a wear away.

EXAMPLE 4

| | PARTS BY WEIGHT |
|---|---|
| Stabilizer, Barium-Zinc type (Irgastab TM BZ 512) | 3.3 |
| PVC dispersion resin KV 75 (Oxy TM 75 HC) | 100 |
| Monoisobutyrate monobenzoate ester (Nuoplaz TM 1046) | 29 |
| Di-(2-ethylhexyl)phtalate | 17 |
| Epoxidized soy bean oil (Paraplex TM B62) | 5 |
| Texanol isobutyrate (TXIB) | 7.7 |
| Viscosity reducing agent (BYK TM 4010) | 2.4 |
| Flitters (PS HR 422 TM) | 1.7 |

This floor covering has shown the same properties as the floor covering obtained in Example 3. It should also be noted that the viscosity can be adjusted by varying the amount TXIB, depending on the application process used.

Although the invention has been described above with respect with one specific form, it will be evident to a person skilled in the art that it may be modified and refined in various ways. It is therefore wished to have it understood that the present invention should not be limited in scope, except by the terms of the following claims.

What is claimed is:

1. A decorative inlaid sheet material comprising a substrate and a layer of plastisol or organosol overlying and in contact with said substrate, said plastisol or organosol containing a dispersion of birefringent particles, the birefringence of said particles being maintained in said layer of plastisol or organosol wherein the concentration of birefringent particles in the plastisol or organosol is from about 0.25 to about 30% by weight.

2. A decorative inlaid sheet material according to claim 1, wherein said birefringent particles are polymeric particles.

3. A decorative inlaid sheet material according to claim 1, wherein said plastisol or organosol is clear or translucent.

4. A decorative inlaid sheet material according to claim 1, wherein said plastisol is a PVC plastisol.

5. A decorative inlaid sheet material according to claim 1, further comprising a layer having a printed pattern on its surface between said substrate and said layer of plastisol or organosol.

6. A decorative inlaid sheet according to claim 1, wherein the concentration of birefringent particles is from about 0.5 to about 2.5% by weight.

7. A decorative inlaid sheet material according to claim 1 further comprising a wear layer over said layer of plastisol or organosol.

* * * * *